United States Patent
Cohen et al.

(10) Patent No.: US 8,325,736 B2
(45) Date of Patent: *Dec. 4, 2012

(54) PROPAGATION OF MINIMUM GUARANTEED SCHEDULING RATES AMONG SCHEDULING LAYERS IN A HIERARCHICAL SCHEDULE

(75) Inventors: Earl T. Cohen, Fremont, CA (US); Robert Olsen, Dublin, CA (US); Christopher J. Kappler, Waltham, MA (US); Anna Charny, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 12/426,245

(22) Filed: Apr. 18, 2009

(65) Prior Publication Data

US 2009/0207846 A1    Aug. 20, 2009

Related U.S. Application Data

(63) Continuation of application No. 11/022,246, filed on Dec. 23, 2004, now Pat. No. 7,522,609.

(51) Int. Cl.
 *H04L 12/56* (2006.01)
(52) U.S. Cl. ............ 370/395.42; 370/232; 370/252; 370/369; 370/408; 370/415
(58) Field of Classification Search ........... 370/229–503
See application file for complete search history.

(56) References Cited

U.S. PATENT DOCUMENTS

| | | | |
|---|---|---|---|
| 5,781,531 A * | 7/1998 | Charny | 370/232 |
| 5,850,399 A * | 12/1998 | Ganmukhi et al. | 370/412 |
| 5,864,540 A | 1/1999 | Bonomi et al. | |
| 5,864,557 A | 1/1999 | Lyons | |
| 5,892,766 A | 4/1999 | Wicki et al. | |
| 6,130,878 A | 10/2000 | Charny | |

(Continued)

FOREIGN PATENT DOCUMENTS

CA     2575814     1/2011

(Continued)

OTHER PUBLICATIONS

"Modular QoS CLI (MQC) Three-Level Hierarchical Policer", Cisco Systems, Inc., San Jose, CA, Oct. 1, 2004.

(Continued)

*Primary Examiner* — Ayaz Sheikh
*Assistant Examiner* — Venkatesh Haliyur
(74) *Attorney, Agent, or Firm* — The Law Office of Kirk D. Williams

(57) ABSTRACT

A hierarchy of schedules propagate minimum guaranteed scheduling rates among scheduling layers in a hierarchical schedule. The minimum guaranteed scheduling rate for a parent schedule entry is typically based on the summation of the minimum guaranteed scheduling rates of its immediate child schedule entries. This propagation of minimum rate scheduling guarantees for a class of traffic can be dynamic (e.g., based on the active traffic for this class of traffic, active services for this class of traffic), or statically configured. One embodiment also includes multiple scheduling lanes for scheduling items, such as, but not limited to packets or indications thereof, such that different categories of traffic (e.g., propagated minimum guaranteed scheduling rate, non-propagated minimum guaranteed scheduling rate, high priority, excess rate, etc.) of scheduled items can be propagated through the hierarchy of schedules accordingly without being blocked behind a lower priority or different type of traffic.

23 Claims, 11 Drawing Sheets

U.S. PATENT DOCUMENTS

| | | | |
|---|---|---|---|
| 6,337,851 B1 | 1/2002 | Charny et al. | |
| 6,408,005 B1 | 6/2002 | Fan et al. | |
| 6,412,000 B1 | 6/2002 | Riddle et al. | |
| 6,438,134 B1 | 8/2002 | Chow et al. | |
| 6,469,983 B2* | 10/2002 | Narayana et al. | 370/231 |
| 6,483,839 B1 | 11/2002 | Gemar et al. | |
| 6,560,230 B1* | 5/2003 | Li et al. | 370/395.42 |
| 6,577,635 B2* | 6/2003 | Narayana et al. | 370/395.42 |
| 6,643,293 B1 | 11/2003 | Carr et al. | |
| 6,691,312 B1 | 2/2004 | Sen et al. | |
| 6,728,270 B1* | 4/2004 | Meggers et al. | 370/514 |
| 6,836,475 B2 | 12/2004 | Chaskar et al. | |
| 6,876,952 B1 | 4/2005 | Kappler et al. | |
| 7,155,502 B1* | 12/2006 | Galloway et al. | 709/223 |
| 7,277,448 B1* | 10/2007 | Long et al. | 370/412 |
| 7,292,531 B1* | 11/2007 | Hill | 370/230.1 |
| 7,321,940 B1* | 1/2008 | Smith et al. | 709/240 |
| 7,324,447 B1* | 1/2008 | Morford | 370/231 |
| 7,324,553 B1* | 1/2008 | Varier et al. | 370/468 |
| 7,366,101 B1* | 4/2008 | Varier et al. | 370/241 |
| 7,385,924 B1* | 6/2008 | Riddle | 370/235 |
| 7,417,999 B1 | 8/2008 | Charny et al. | |
| 7,433,304 B1* | 10/2008 | Galloway et al. | 370/229 |
| 7,433,953 B1 | 10/2008 | Kappler et al. | |
| 7,522,609 B2* | 4/2009 | Cohen et al. | 370/395.42 |
| 7,567,572 B1* | 7/2009 | Charny et al. | 370/395.4 |
| 7,664,048 B1* | 2/2010 | Yung et al. | 370/253 |
| 7,675,926 B2* | 3/2010 | Olsen et al. | 370/412 |
| 8,077,618 B2* | 12/2011 | Kappler et al. | 370/235 |
| 2001/0001608 A1* | 5/2001 | Parruck et al. | 370/232 |
| 2003/0002482 A1* | 1/2003 | Kubler et al. | 370/352 |
| 2003/0067903 A1* | 4/2003 | Jorgensen | 370/338 |
| 2003/0123449 A1 | 7/2003 | Kuhl et al. | |
| 2004/0013089 A1* | 1/2004 | Taneja et al. | 370/235 |
| 2004/0081167 A1* | 4/2004 | Hassan-Ali et al. | 370/395.42 |
| 2004/0090952 A1* | 5/2004 | Kubler et al. | 370/352 |
| 2004/0114567 A1* | 6/2004 | Kubler et al. | 370/349 |
| 2005/0018601 A1* | 1/2005 | Kalkunte et al. | 370/229 |
| 2005/0152374 A1* | 7/2005 | Cohen et al. | 370/395.4 |
| 2005/0192037 A1* | 9/2005 | Nanda et al. | 455/509 |
| 2006/0029079 A1 | 2/2006 | Cohen et al. | |
| 2006/0029080 A1* | 2/2006 | Kappler et al. | 370/395.4 |
| 2006/0153243 A1 | 7/2006 | Shoham et al. | |
| 2009/0207846 A1* | 8/2009 | Cohen et al. | 370/395.4 |

FOREIGN PATENT DOCUMENTS

| | | |
|---|---|---|
| EP | 0981228 A2 | 2/2000 |
| WO | 02/15520 A1 | 2/2002 |
| WO | WO 2006017753 A2 * | 2/2006 |

OTHER PUBLICATIONS

Bennett et al., "Hierarchical Packet Fair Queueing Algorithms," IEEE/ACM Transactions on Networking (TON), vol. 5, Issue 5, Oct. 1997, pp. 675-689.

Hou et al., "Service Disciplines for Guaranteed Performance Service," Proceedings—Fourth International Workshop on Real-Time Computing Systems and Applications, Oct. 27-29, 1997, pp. 244-250, Taipei.

Hagai et al., "Multiple Priority, Per Flow, Dual GCRA Rate Controller for ATM Switches," Electrical and Electronic Engineers in Israel, 2000. The 21st IEEE Convention, Apr. 11-12, 2000, pp. 479-482, Tel-Aviv, Israel.

Kim et al., "Three-level Traffic Shaper and its Application to Source Clock Frequency Recovery for VBR Services in ATM Networks," IEEE/ACM Transaction on Networking (TON), vol. 3, Issue 4, Aug. 1995, pp. 450-458.

Dixit et al., "Traffic Descriptor Mapping and Traffic Control for Frame Relay Over ATM Network," IEEE/ACM Transactions on Networking (TON), vol. 6, Issue 1, Feb. 1998, pp. 56-70.

Bennett et al., "WF$^2$Q: Worst-case Fair Weighted Fair Queueing," INFOCOM '96. Fifteenth Annual Joint Conference of the IEEE Computer Societies Networking the Next Generation. Proceedings IEEE. Mar. 24-28, 1996, vol. 1, pp. 120-128.

Bennett et al., "High-Speed, Scalable, and Accurate Implementation of Fair Queueing Algorithms in ATM Networks," ICNP '97, http://www-2.cs.cmu.edu/~hzhang/papers/ICNP97.pdf, 1997.

Jon C.R. Bennett et al., "Hierarchical Packet Fair Queuing Algorithms", IEEE ACM Transactions on Networking, 5(5). pp. 675-689, Oct. 1997.

J.D. Foley et al., "Computer Graphics: Principles and Practice", Addison-Wesley, 1990, pp. 74-80.

T. Cormen et al., "Introduction to Algorithms", The MIT Press, Chapter 9,1990.

S.J. Golestani, "A Self-Clocked Fair Queuing Scheme for Broadband Applications", Proc. INFOCOM'94, pp. 636-646, Apr. 1994.

P. Goyal et al., "Start-time fair queuing: a scheduling algorithm for integrated services packet switching networks", Proc. Sigcomm, 1996.

Chris Kappler et al., "HQF Implementation Based on Sorting Trees (HIST)", Cisco Systems, Dee. No. EDCS-273780—rev 3.9, pp. 1-123.

S. Keshav et al., "An Engineering Approach to Computer Networking", Addison-Wesley, Chapter 9, 1997.

J-Y Leboudec et al., "A Short Tutorial on Network Calculus I: Fundamental Bounds in Communication Networks", Proceedings ISCAS2000, Geneva, Switzerland, May 2000.

W. Leland et al., "On the Self-Similar Nature of Ethernet Traffic", SIGCOMM'93. pp. 183-193, 1993.

A.K.J. Parekh, "A Generalized Processor Sharing Approach to Flow Control in Integrated Services Networks", Ph.D. thesis, Massachusetts Institute of Technology, Feb. 1992.

M. Roughan et al., "Measuring long-range dependence under changing traffic conditions", in Proc. IEEE INFOCOM'99, New York, NY, Mar. 1999, pp. 338-341.

Ion Stoica et al., "Earliest Eligible Virtual Deadline First: A Flexible and Accurate Mechanism for Proportional Share Resource Allocation", Department of Computer Science, Old Dominion University, Norfolk, Virginia, TR-95-22, Jan. 26, 1996, pp. 1-37.

Ion Stoica et al., "An Efficient Packet Service Algorithm for High Speed ATM Switches", Department of Computer Science, Old Dominion University. Norfolk, Virginia. pp. 1-24.

K. Thompson et al., "Wide-Area Internet Traffic Patterns and Characteristics", IEEE/ACM Transactions on Networking, pp. 10-23, Nov. 1997.

T. Tuan et al., "Multiple Time Scale Congestion Control for Self-Similar Network Traffic". Performance Evaluation, 36:359-386, 1999.

M. Shreedhar and George Varghese, "Efficient Fair Queuing Using Deficit Round-Robin," IEEE/ACM Transactions on Networking, vol. 4, No. 3, Jun. 1996, pp. 375-385.

Response Filed in European Patent Application No. 05778432.4, dated Aug. 30, 2011 (17 pages).

Examination Report in European Patent Application No. 05778432.4, dated Sep. 28, 2011 (4 pages).

Intention to Grant in European Patent Application No. 05778432.4, European Patent Office, dated Aug. 1, 2012 (46 pages).

* cited by examiner

PROPAGATION OF MINIMUM GUARANTEED SCHEDULING RATES AMONG SCHEDULING LAYERS IN A HIERARCHICAL SCHEDULE

CROSS-REFERENCE TO RELATED APPLICATIONS

This is a continuation of copending nonprovisional application Ser. No. 11/022,246, filed Dec. 23, 2004, which is a continuation-in-part of U.S. patent application Ser. No. 10/913,055, filed Aug. 5, 2004, and of U.S. patent application Ser. No. 10/758,547, filed Jan. 4, 2004, with the complete disclosures of these three application being hereby incorporated by reference.

TECHNICAL FIELD

One embodiment of the invention relates to communications and computer systems, especially routers, packet switching systems, and other devices; and more particularly, one embodiment relates to a hierarchy of schedules with propagation of minimum guaranteed scheduling rates among scheduling layers in a hierarchical schedule.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet. For example, an enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. Once the entire packet is written into memory, the packet becomes eligible for processing, and an indicator of the packet is typically placed in an appropriate destination queue for being serviced according to some scheduling methodology.

When there is a contention for resources, such as on output links of a packet switching system or interface or even for compute cycles in a computing device, it is important for resources to be allocated or scheduled according to some priority and/or fairness policy. Moreover, the amount of work required to schedule and to enqueue and dequeue a packet or other scheduled item is important, especially as the operating rate of systems increase. Many different mechanisms have been used by an individual schedule to schedule packets, many of which are described hereinafter.

Ordinary time division multiplexing (TDM) is a method commonly used for sharing a common resource between several clients. All scheduled clients are served one at a time at predetermined times and for pre-allocated time periods, which is a very useful property for many applications. This method is often used for multiplexing multiple synchronous items over a higher speed communications link, such as that used for multiplexing multiple telephone calls over a single facility or interleaving packets. However, in a dynamic environment wherein items may not require the full amount of their allocated time slot such as when an item may only require none or only a portion of a particular allocated time slot, then bandwidth of the resource is typically wasted.

Ordinary round-robin (RR) is another method commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly. For example, certain higher priority or larger bandwidth ports or streams of packets may not get their desired amount of bandwidth, which may especially be the case when serving one large and numerous smaller traffic streams or when different priorities of traffic are scheduled.

In some scenarios, high priority (e.g., low latency), guaranteed bandwidth, best effort traffic (e.g., spare bandwidth) and other classifications of traffic compete for a common resource. Various known scheduling methods are designed to provide isolation, prioritization, and fair bandwidth allocation to traffic competing for a common resource. These are known as fair queuing methods. Some examples are Weighted Fair Queuing (WFQ), Self-Clocked Fair Queuing (SCFQ), and Deficit Round Robin/Surplus Round Robin (referred to as DRR).

WFQ and SCFQ depend upon arrival times as well as previous link utilization in order to calculate the next best packet to send. The accepted "ideal" behavior is bit-by-bit or weighted bit-by-bit round robin which assigns each bit of each packet in the system an ideal finish time according to the weighted fair sharing of the system. This is typically not practical in a packet-based system unless all packets are one bit. Generalizing the algorithm from bit-by-bit to packet-by-packet, each packet is assigned an ideal finish (departure) time and the packets are served in order of the earliest departure time. The inclusion of theoretical departure times in a scheduling method typically requires insertion into a sorted list which is known to be an O(log N) problem implemented in software, where N is typically the number of queues. In hardware, this problem may be reduced to an O(1) operation with O(log N) resources.

DRR is a method used for sharing a common resource between several clients with different ratios between clients (i.e., some clients are allowed to consume more of the resources than others). The ratio between clients is typically defined by a parameter called a quantum. There are many variations and different implementations of DRR, including that described hereinafter.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will consume an equal amount of bandwidth.

This DRR approach works in rounds, where a round is one round-robin iteration over the queues that have items to be sent. Typically, when the queue is scheduled, it is allowed to transmit until its deficit becomes negative (or non-positive), and then the next queue is served. Packets coming in on different flows are stored in different queues. Each round, each queue is allocated a quantum worth of bytes, which are added to the deficit of each queue. Each queue is allowed to send out one or more packets in a DRR round, with the exact number of packets being sent in a round being dependent on its quantum and the size of the packets being sent. Typically, as long as the deficit is a positive (or non-negative) value (i.e., it is authorized to send a packet) in a DRR round for a queue and it has one or more packets to send, a packet is sent and its deficit is reduced based on the size of the sent packet. If there are no more packets in a queue after the queue has been serviced, one implementation sets the deficit corresponding to the queue to zero, while one implementation does this only if its deficit is negative. Otherwise, the remaining amount (i.e., the deficit minus the number of bytes sent) is maintained for the next DRR round.

DRR has a complexity of O(1)—that is the amount of work required is a constant and independent of the number of packets enqueued. In order to be work conserving, a packet should be sent every time a queue is scheduled no matter its size. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal." In particular, latency for a system with N queues is Q*N where Q is the average quantum, which must be at least one maximum transmission unit (MTU).

These scheduling techniques can work well for scheduling a single layer of service or traffic. However, bandwidth is being sold to end customers based on types and aggregation of traffic. For example, customers might subscribe to certain types of traffic with different delay and bandwidth requirements, such as voice, video, gaming, email, instant messaging, and Internet browsing. Some of these traffic types can be very time and delay sensitive, while other types of traffic can be serviced using a best effort without too much impact on the service. Thus, service providers may be able to sell a premium service which provides a minimum guaranteed service rate for specific one or more types of traffic, while providing best effort service for its remaining types of traffic.

However, the scheduling of multiple types of traffic with guaranteed minimum scheduling rates intermixed with other traffic can be complex, especially when each of these layers of services are aggregated with other end users and possibly other customers, and especially in the context of the dynamic traffic, such as the intermittent, partial and/or full use of subscribed services and changing types of traffic and number of sources. For example, the guaranteed rate traffic and best effort traffic may be aggregated on a digital subscriber line (DSL) or as part of a virtual LAN (VLAN), with each of these layers of service typically having their own service requirements. If a policer function is used to limit the traffic rate for a maximum subscribed rate, then packets are typically dropped or service backpressured. However, indiscriminate dropping of packets or throttling of all types of traffic can especially impact services which are delay and bandwidth sensitive. Also, traffic with guaranteed service rates needs to be serviced accordingly, while not allowing one source to consume its guaranteed service rate along with the guaranteed service rate of others which is not currently being used by them. Needed are new ways to accommodate different types and aggregations of traffic.

SUMMARY

Disclosed are, inter alia, methods, apparatus, data structures, computer-readable media, and mechanisms, which may include or be used with a hierarchy of schedules with propagation of minimum guaranteed scheduling rates among scheduling layers in a hierarchical schedule. In one embodiment, the minimum guaranteed scheduling rate for a parent schedule entry is typically based on the summation of the minimum guaranteed scheduling rates of its immediate child schedule entries. This propagation of minimum rate scheduling guarantees for a class of traffic can be dynamic (e.g., based on the active traffic for this class of traffic, active services for this class of traffic), or statically configured. One embodiment also includes multiple scheduling lanes for scheduling items, such as, but not limited to packets or indications thereof, such that different categories of traffic (e.g., propagated minimum guaranteed scheduling rate, non-propagated minimum guaranteed scheduling rate, high priority, excess rate, etc.) of scheduled items can be propagated through the hierarchy of schedules accordingly without being blocked behind a lower priority or different type of traffic.

Note, the term "particular machine," when recited in a method claim for performing steps, refers to a machine within the 35 USC §101 machine statutory class.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
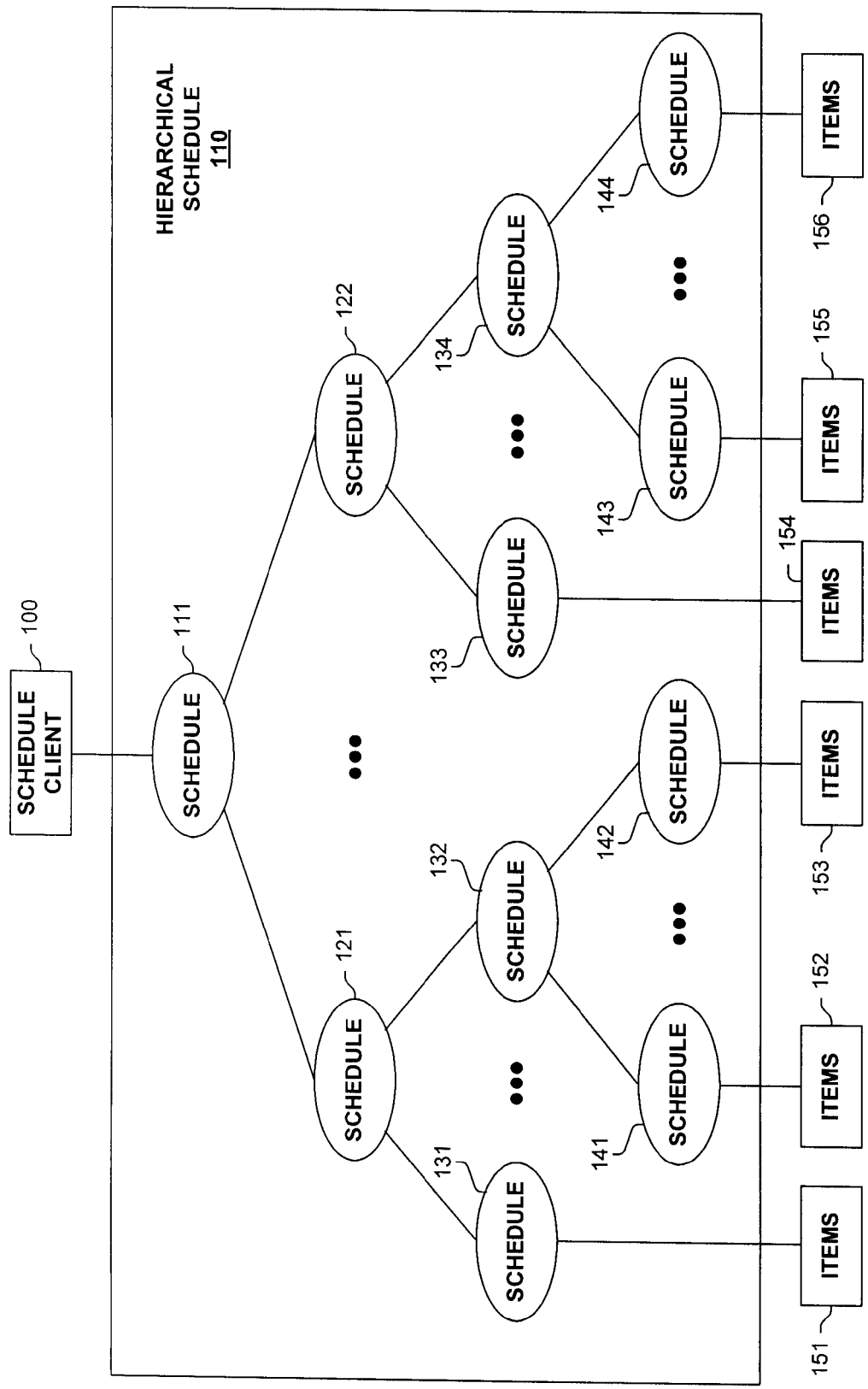
FIG. 1A is a block diagram of an exemplary hierarchical schedule used in one embodiment.

Disclosed are, inter alia, methods, apparatus, data structures, computer-readable media, and mechanisms, which may include or be used with a hierarchy of schedules and/or a hierarchy of schedules with multiple scheduling lanes for scheduling items.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

One embodiment includes a hierarchy of individual schedules for scheduling items, such as, but not limited to packets or indications thereof, such that different classes of priority items can be propagated through the hierarchy of schedules accordingly. Note, herein are described many different embodiments and aspects thereof. Some of the aspects described may be global or local in nature. For example, an aspect may be the same for all schedules of a hierarchical schedule, only applicable to less than all schedules, or even only applicable to certain scheduling categories, scheduling lanes or for one or more connections from a child schedule to a parent schedule, etc. For ease of reader understanding, one embodiment is typically explained in the context of a hierarchy of schedules through which items propagate; however, the teachings of which are applicable to other embodiments in which information is distributed through the hierarchy of schedules and a search is performed through the hierarchy to identify the next scheduled item to be forwarded (e.g., rather than actually propagating scheduled items through the hierarchy of schedules), such as in, but not limited to a recursive descent approach and/or that described in U.S. patent application Ser. No. 10/758,547, filed Jan. 4, 2004, with the complete disclosure of which is hereby incorporated by reference. Typically, in the recursive descent approach, the items propagated through the hierarchical scheduler are status indications (i.e., indicating the best item and/or available items).

In one embodiment, the propagated minimum guaranteed scheduling rate for a parent schedule entry is typically based on the summation of the propagated minimum guaranteed scheduling rates of its immediate child schedule entries. This propagation of minimum rate scheduling guarantees for a class of traffic can be dynamic (e.g., based on the active traffic for this class of traffic, active services for this class of traffic), or statically configured. One embodiment also includes multiple scheduling lanes for scheduling items, such as, but not limited to packets or indications thereof, such that different categories of traffic (e.g., propagated minimum guaranteed scheduling rate, non-propagated minimum guaranteed scheduling rate, high priority, excess rate, etc.) of scheduled items can be propagated through the hierarchy of schedules accordingly without being blocked behind a lower priority or different type of traffic.

Also, one embodiment limits the total aggregated rate at which a subset of items (e.g., all items, just those items of a propagated minimum guaranteed scheduling rate type, etc.) can be forwarded from a child schedule to the parent schedule entry of a parent schedule to that of the propagated minimum guaranteed scheduling rate of the parent schedule entry (e.g., the summation, or a variant thereof, of the propagated minimum scheduling rates of the child schedule entries of the child schedule). This limitation is sometimes used to prevent one propagated minimum guaranteed scheduling rate service from using unused propagated minimum guaranteed scheduling rate bandwidth of another propagated minimum guaranteed scheduling rate service.

One embodiment includes a parent schedule including a parent schedule entry for use in scheduling traffic including items of a propagated minimum guaranteed scheduling rate type; and a child schedule including multiple child schedule entries for use in scheduling traffic including items of the propagated minimum guaranteed scheduling rate type, with each of the child schedule entries being associated with propagated minimum guaranteed scheduling rates for scheduling its traffic. The parent schedule entry is associated with a parent propagated minimum guaranteed scheduling rate for scheduling its traffic including items of the propagated minimum guaranteed scheduling rate type. The parent propagated minimum guaranteed scheduling rate is typically determined based on an aggregation of the propagated minimum guaranteed scheduling rates associated with the child schedule entries, or some variant thereof.

In one embodiment, the items include packets or indications corresponding to the packets. In one embodiment, the scheduling of traffic by the child schedule includes updating a particular schedule entry of the child schedule entries for each packet to be forwarded corresponding to the particular schedule entry based on the size of a corresponding packet of the packets. In one embodiment, the scheduling of traffic by the parent schedule includes updating the parent schedule entry for each packet to be forwarded corresponding to the parent schedule entry based on the size of a corresponding packet of the packets. In one embodiment, each of the multiple child schedule entries is scheduled with a maximum traffic rate equal to its corresponding propagated minimum guaranteed scheduling rate. In one embodiment, traffic of the propagated minimum guaranteed scheduling rate type in each of the multiple child schedule entries is scheduled with a maximum traffic rate equal to its said corresponding propagated minimum guaranteed scheduling rate. In one embodiment, the parent schedule includes storage for each of multiple scheduling categories, including the propagated minimum guaranteed scheduling rate type. In one embodiment, items corresponding to the propagated minimum guaranteed scheduling rate type are scheduled at the parent propagated minimum guaranteed scheduling rate. In one embodiment, the multiple scheduling categories include a non-propagated minimum guaranteed scheduling rate type. In one embodiment, the multiple scheduling categories include a high priority traffic category to be scheduled by the parent schedule and the child schedule with a higher scheduling priority than the propagated minimum guaranteed scheduling rate traffic. In one embodiment, the parent propagated minimum guaranteed scheduling rate is equal to the sum of the propagated minimum guaranteed scheduling rates associated with the child schedule entries. In one embodiment, the parent propagated minimum guaranteed scheduling rate is equal to the sum of the propagated minimum guaranteed scheduling rates associated with the child schedule entries which are actively scheduling traffic of the propagated minimum guaranteed scheduling rate type. In one embodiment, the parent propagated minimum guaranteed scheduling rate does not include the propagated minimum guaranteed scheduling rates associated with a particular one of the child schedule entries which is not actively scheduling traffic of the propagated minimum guaranteed scheduling rate type. In one embodiment, the aggregation of the propagated minimum guaranteed scheduling rates associated with the child schedule entries excludes the propagated minimum guaranteed scheduling rates associated with the child schedule entries that are not actively scheduling traffic of the propagated minimum guaranteed scheduling rate type.

One embodiment includes a root schedule and one or more layers of schedules. Each of the one or more layers includes at least one schedule. Each schedule of the one or more layers of schedules includes one or more schedule entries. Each schedule of the one or more layers of schedules is configured to communicate selected scheduled items to its parent schedule entry of a parent schedule in the hierarchical schedule. Each particular schedule entry of the hierarchical schedule having one or more child schedules is configured to maintain items of different scheduling categories received from the child schedules. Each particular schedule of the hierarchical schedule having one or more child schedules is configured to schedule the sending of items to its parent schedule or to a schedule client based on the different scheduling categories of the items. The different scheduling categories typically include a propagated minimum guaranteed scheduling rate type, and each of multiple schedule entries is associated with a propagated minimum guaranteed scheduling rate. The propagated minimum guaranteed scheduling rate of a parent schedule entry is typically determined based on an aggregation of said propagated minimum guaranteed scheduling rates of each of said schedule entries of its immediate child schedule.

In one embodiment, a maximum traffic rate of each of the immediate child schedule entries is approximately equal to its corresponding propagated minimum guaranteed scheduling rate. In one embodiment, a maximum traffic rate of each of the immediate child schedule entries is equal to its corresponding propagated minimum guaranteed scheduling rate. In one embodiment, the propagated minimum guaranteed scheduling rate of a parent schedule entry is equal to the sum of the propagated minimum guaranteed scheduling rate of each of its immediate child schedule entries. In one embodiment, the different scheduling categories also include a high priority traffic type; wherein items corresponding to the high priority traffic type are forwarded prior to items corresponding to the propagated minimum rate guarantee traffic type and/or minimum rate guarantee traffic type. In one embodiment, the items include packets or indications corresponding to the packets. In one embodiment, the scheduling of items includes updating a particular schedule entry of the schedule entries for each packet to be forwarded corresponding to the particular schedule entry based on the size of a corresponding packet of the packets. In one embodiment, the propagated minimum guaranteed scheduling rate of the parent schedule entry is equal to the sum of the propagated minimum guaranteed scheduling rate of each of its immediate child schedule entries which are actively scheduling traffic of the propagated minimum guaranteed scheduling rate type. In one embodiment, the propagated minimum guaranteed scheduling rate of the parent schedule entry does not include the propagated minimum guaranteed scheduling rates associated with a particular one of its immediate child schedule entries which is not actively scheduling traffic of the propagated minimum guaranteed scheduling rate type. In one embodiment, the aggregation of the propagated minimum guaranteed scheduling rate of each of its immediate child schedule entries of the schedules excludes the propagated minimum guaranteed scheduling rate of each of its immediate child schedule entries of the schedules that are not actively scheduling traffic of the propagated minimum guaranteed scheduling rate type.

FIG. 1A is a block diagram of an exemplary hierarchical schedule 110 used in one embodiment. As illustrated, items 151-156 are received by hierarchical schedule 110 and are propagated through one or more schedules 121-144 to reach schedule 111 and then forwarded to the schedule client 100. Schedule 111 is sometimes referred to as the root schedule as it corresponds the root of a tree formed by schedules 121-144. Each of the schedules 111-144 schedules traffic independently (although minimum guaranteed rates may be propagated from one or more child schedules/schedule entries to their parents), which typically includes scheduling traffic of two or more different scheduling categories, such as, but not limited to, high-priority traffic, low-priority traffic, rate-based traffic, propagated minimum guaranteed rate traffic. By providing multiple scheduling lanes or another mechanism for direct access to different categories of traffic, items of a higher priority can propagate through hierarchical schedule 110 without being blocked by or otherwise delayed behind lower priority traffic. Note, each schedule typically has a single parent schedule with one or more schedule entries or an external client, and one or more child schedules and/or external sources for items. The number of schedules and their arrangement in an embodiment using a hierarchical schedule is typically determined based on the needs of the application of the embodiment.

One embodiment includes a hierarchical schedule for use in scheduling items of multiple different scheduling categories, including a propagated minimum guaranteed scheduling rate category and a rate based category. The hierarchical schedule includes a parent schedule and multiple child schedules. The parent schedule includes multiple schedule entries and a scheduling mechanism, with each of the schedule entries corresponding to a different one of the child schedules and the scheduling mechanism being configured to identify a best scheduled item from the schedule entries. Items of the propagated minimum guaranteed scheduling rate category and items of the rate based category share a common minimum guaranteed rate in each of the plurality of schedule entries; and wherein items corresponding to the propagated minimum guaranteed scheduling rate category associated with a particular schedule entry of the plurality of schedule entries are scheduled before items corresponding to the rate based category associated with the particular schedule entry.

In one embodiment, items of the propagated minimum guaranteed scheduling rate category and items of the rate based category share a common maximum rate in each of the plurality of schedule entries. In one embodiment, the different scheduling categories include a priority scheduling category; and items corresponding to the priority scheduling category associated with the particular schedule entry are scheduled before items corresponding to the propagated minimum guaranteed scheduling rate and rate based scheduling categories. In one embodiment, the scheduling categories include a priority scheduling category, and items corresponding to the priority scheduling category are scheduled before items corresponding to the propagated minimum guaranteed scheduling rate and rate based scheduling categories.

Figure 1B:
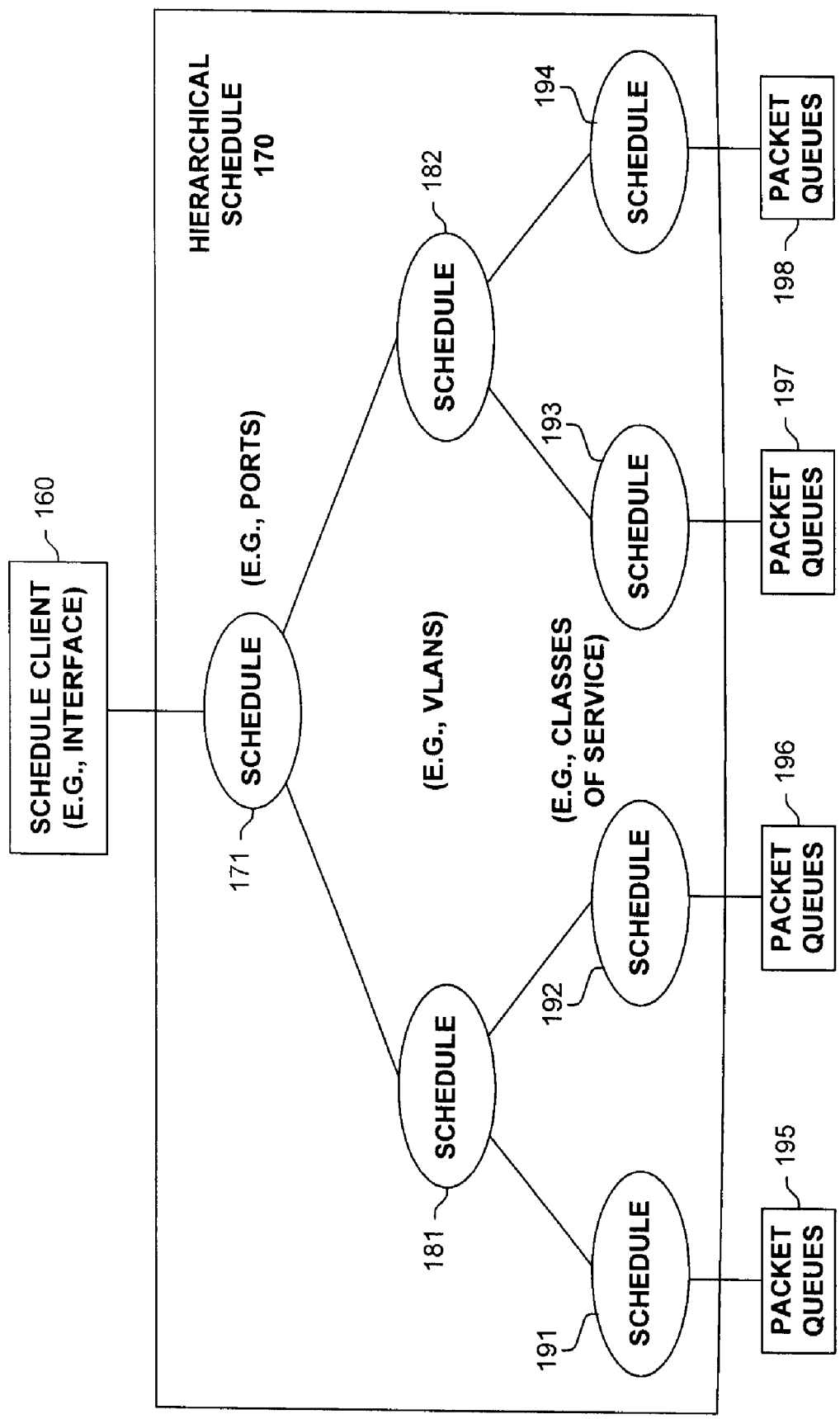
FIG. 1B is a block diagram of an exemplary hierarchical schedule used in one embodiment.

FIG. 1B illustrates an example use of hierarchical schedule 170 in the context of items being packets or indications corresponding to packets. Note, one embodiment of a hierarchical schedule could be used for scheduling ingress and/or egress packet traffic. In the illustrated example, hierarchical schedule 170 is responsible for scheduling the sending of packets received from packet queues 195-198. Hierarchical schedule 170 accomplishes this using multiple scheduling layers: a class of service scheduling layer using schedules 191-194, with their parent schedules 181-182 corresponding to a VLAN scheduling layer, with their parent schedule 171 corresponding to a port schedule, which provides the packets or indications thereof to schedule client 160, corresponding to an interface.

Each of the schedules 171-194 schedules traffic independently, which typically includes two or more different scheduling categories, such as, but not limited to, high-priority traffic, low-priority traffic, rate-based traffic, propagated minimum guaranteed rate traffic. By providing multiple scheduling lanes or another mechanism for direct access to different categories of traffic, packets or indications thereof of a higher priority can propagate through hierarchical schedule 170 without being blocked by or waiting behind lower priority traffic. Note, each schedule typically has as its parent a single parent schedule entry of a parent schedule or an external client, and one or more child schedules and/or external sources for items. The number of schedules and schedule entries thereof, and their arrangement in an embodiment using a hierarchical schedule is typically determined based on the needs of the application of the embodiment. In one embodiment, a schedule has as its parent multiple schedule entries of a parent schedule, such as for, but not limited to, a schedule entry for each scheduling category—although the parent schedule entries will typically (but not in one embodiment) share one or more scheduling parameters, such as a maximum rate.

Figure 2:
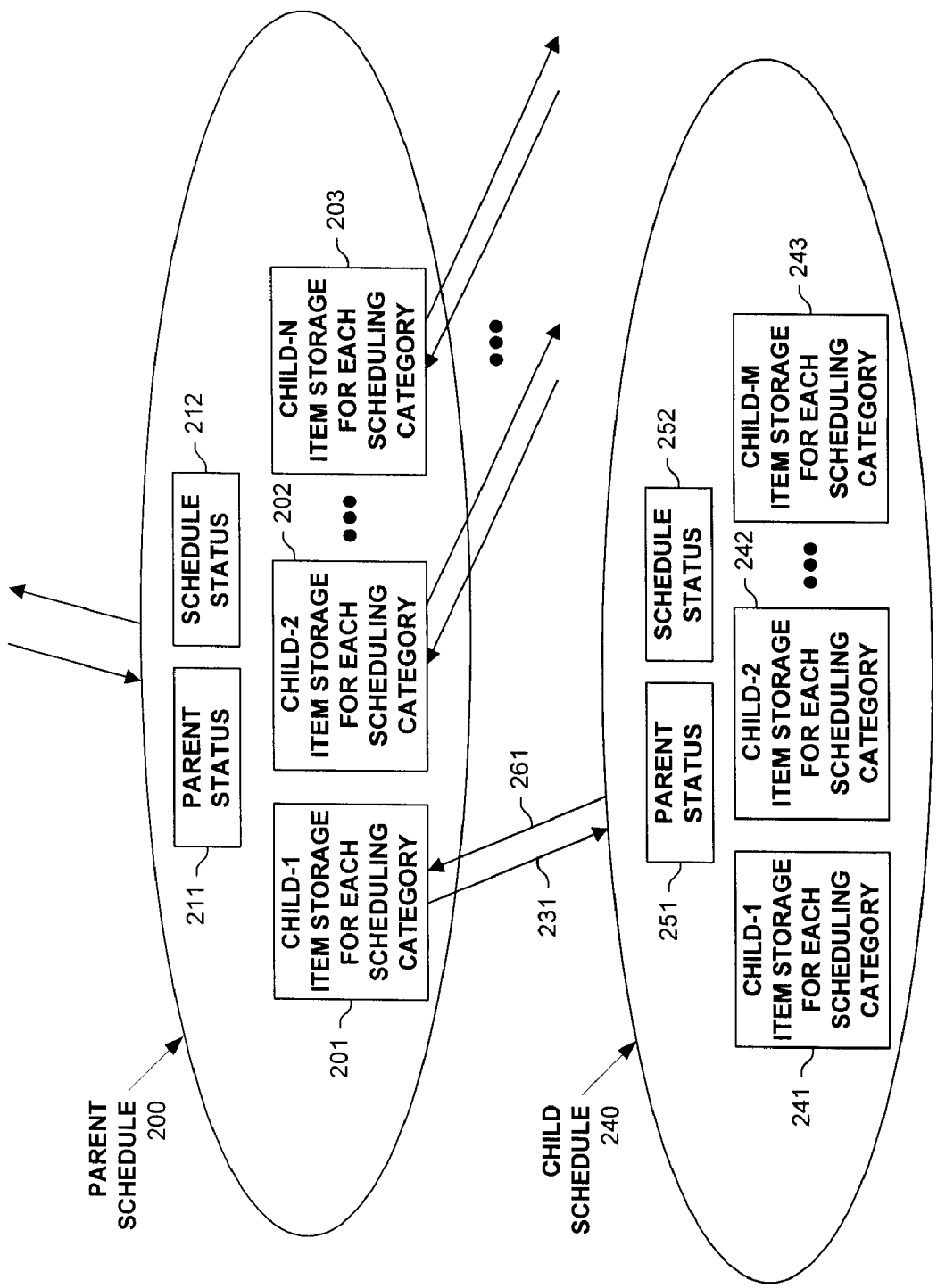
FIG. 2 is a block diagram illustrating a parent schedule and one of its child schedules used in one embodiment.

FIG. 2 is used to describe a parent schedule 200 and one of its child schedules 240 used in one embodiment. As shown, parent schedule 200 includes storage 201-203 (typically corresponding to a schedule entry) for items received from each of its child schedules (240 and others not shown) for each scheduling category (e.g., high-priority traffic, low-priority traffic, rate-based traffic, or whatever categories match the needs of the application of the embodiment). By segregating the items by scheduling categories received from different child schedules, parent schedule 200 is able to propagate different types or priorities of traffic ahead of other traffic, even if such traffic was received earlier. Similarly, child schedule 240 includes storage 241-243 for items received from each of its child schedules for each scheduling category.

Any type of scheduling mechanism can be used to identify the best item from the items received from its child schedules or external sources. For example, one embodiment uses two types of traffic categories: a high-priority traffic and rate-based traffic. Items of the high-priority traffic are scheduled to be strictly forwarded before any rate-based items, with the rate-based traffic being scheduled (e.g., using a calendar schedule, DRR, or other scheduling mechanism) in the remaining bandwidth.

One embodiment also maintains one or more data structures indicating the categories of traffic which it currently has stored, and those categories which its parent schedule has stored or needs from it. For example, parent schedule 200 maintains parent status information 211 and its schedule status information 212, and child schedule 240 maintains parent status information 251 (i.e., corresponding to parent schedule 200) and its schedule status information 252. In this manner, a child schedule can readily determine (e.g., based on a comparison of its maintained parent and own status information) which type of traffic it has available to forward to its parent schedule and which matches the needs of its parent schedule. In one embodiment, each schedule stores up to a single item of each category from each of its child schedules or external item sources, and uses one or more bitmaps to maintain this status information. In one embodiment, each schedule stores up to more than one item of each category from each of its child schedules or external item sources, and uses one or more sets of counters to maintain this status information. In one embodiment, each schedule includes multiple schedule entries, each associated with a unique child schedule or external source, and the schedule entries themselves contain storage for one or more items of each scheduling category. Note, in one embodiment, one or more scheduling categories are consolidated into fewer and/or a single scheduling category by a sending schedule and/or a receiving schedule.

Figure 3A:
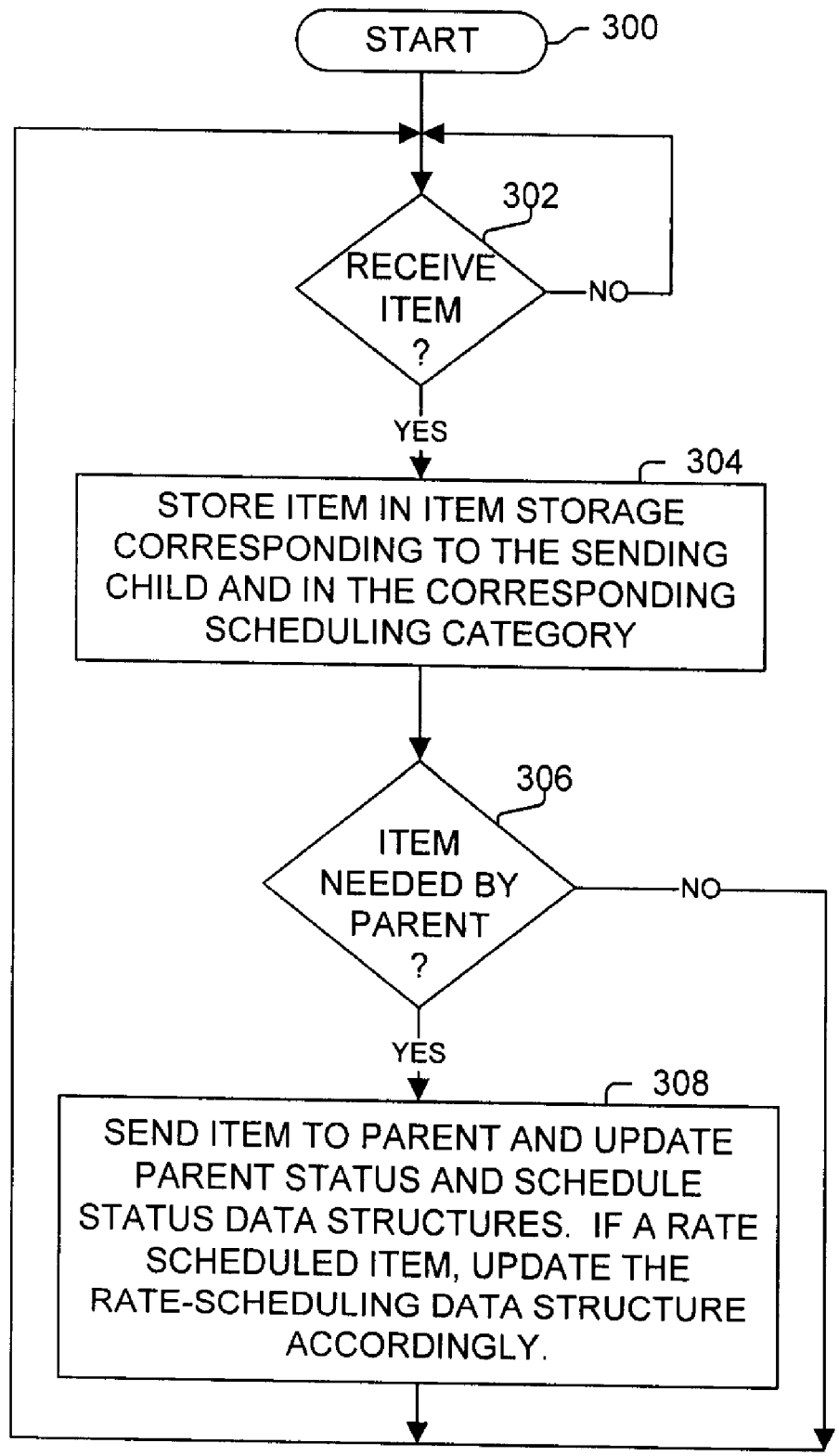
FIGS. 3A-C are flow diagrams of processes for propagating items through a hierarchical schedule in one embodiment.

FIG. 3A illustrates a process used in one embodiment for propagating items to a parent schedule entry of a parent schedule upon startup or in response to a previously unfulfilled request to this child schedule for an item of the particular scheduling category. Processing begins with process block 300. As determined in process block 302, if an item has been previously received, then in process block 304, the item is stored in the item storage corresponding to the sending child schedule or external source for the scheduling category. A determination is made in process block 306, whether or not the item of that scheduling category is needed by the parent schedule entry of the parent schedule. In one embodiment, this determination includes comparing the indications of items needed in its parent status data structure with indications of items that it has received from its child in its schedule status data structure. Note, in one embodiment, items are not considered for forwarding (here and in regards to other forwarding decisions) if the propagation of its corresponding scheduling category has been halted due to a flow control or other mechanism.

As determined in process block 306, if the item of that scheduling category is needed by the parent schedule entry of the parent schedule, then in process block 308, a corresponding item is sent to its parent and the parent status and schedule status data structures are updated. Also, if the item was a rate-based item, then the rate scheduling data structure is updated. In one embodiment, the determination made in process block 306 includes identifying that a parent schedule entry does not need an item of a particular scheduling category, even though it has storage space for the item of the particular scheduling category, if the parent schedule entry already has an item of a scheduling category with a higher scheduling priority than the scheduling priority of the particular scheduling category. Processing returns to process block 302.

Figure 3B:
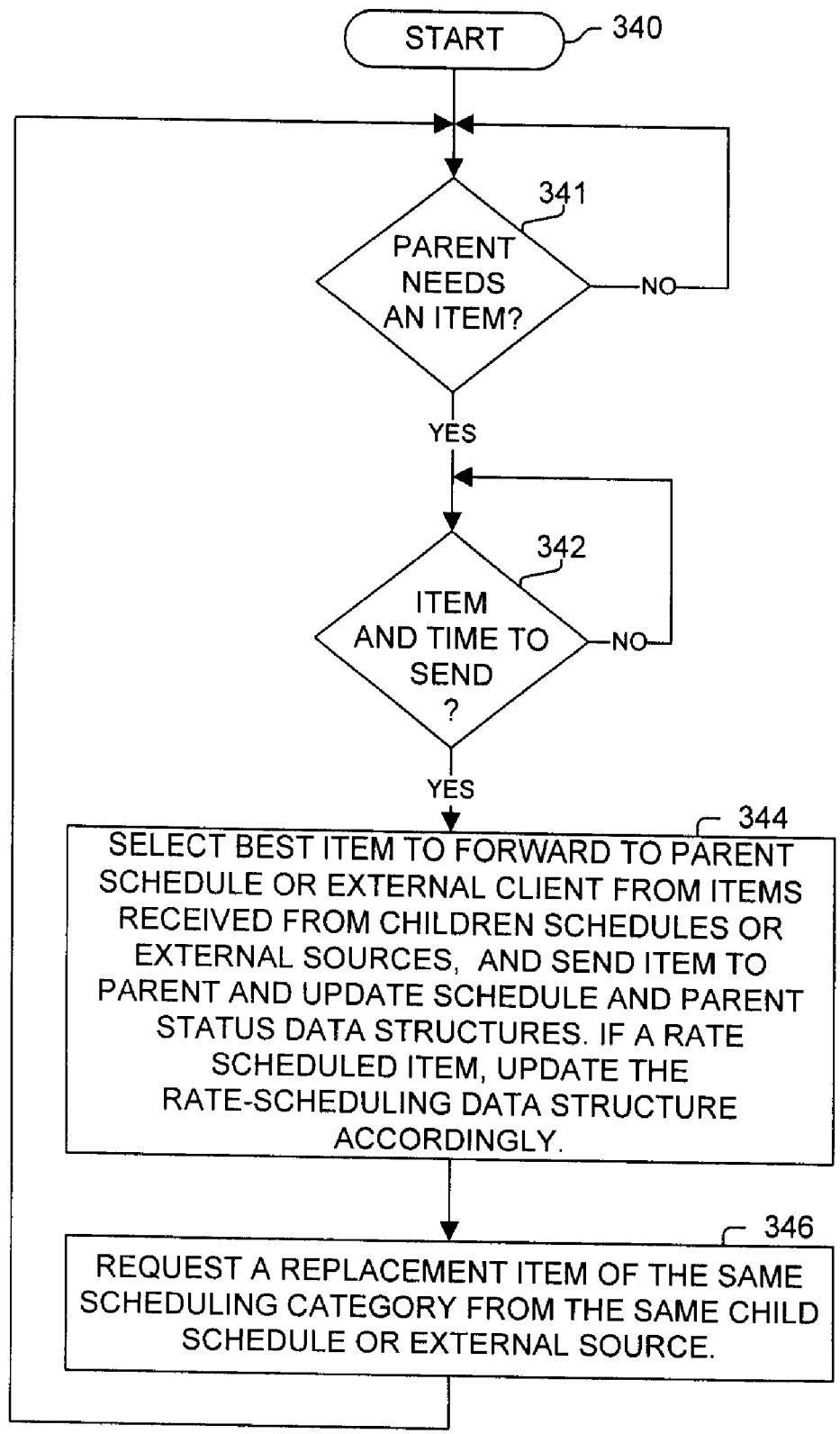

FIG. 3B illustrates a process used in one embodiment for scheduling items which have been received from its child schedules or external sources. Processing begins at process block 340. As indicated by process block 341, processing is delayed or prevented until the parent schedule entry of a parent schedule or client needs an item. Then, as determined in process block 342, if the schedule has an item to send (and it is time to send a next item in one embodiment), then in process block 344, a best item, typically of the highest priority scheduling category needed by the parent, to be forwarded to the parent schedule entry of a parent schedule or client is determined (or has been already determined), and this best item is sent. The schedule's parent status and schedule status data structures are updated accordingly. Also, if the item was a rate-based item, then the rate scheduling data structure is updated.

Note, the hierarchical schedule allows different embodiment to use different scheduling mechanisms, while providing a mechanism to schedule traffic received from several child schedules or external sources and to allow higher priority traffic to be propagated through the hierarchy of schedules without having to wait behind lower priority traffic. Also note, in one embodiment, one or more scheduling categories are consolidated into fewer and/or a single scheduling category by a sending schedule and/or a receiving schedule.

In process block 346, a request for a replacement item is sent to the child schedule or external source from which the sent item was received, typically along with an indication of the traffic category from which the sent item belongs. Processing then returns to process block 341.

Figure 3C:
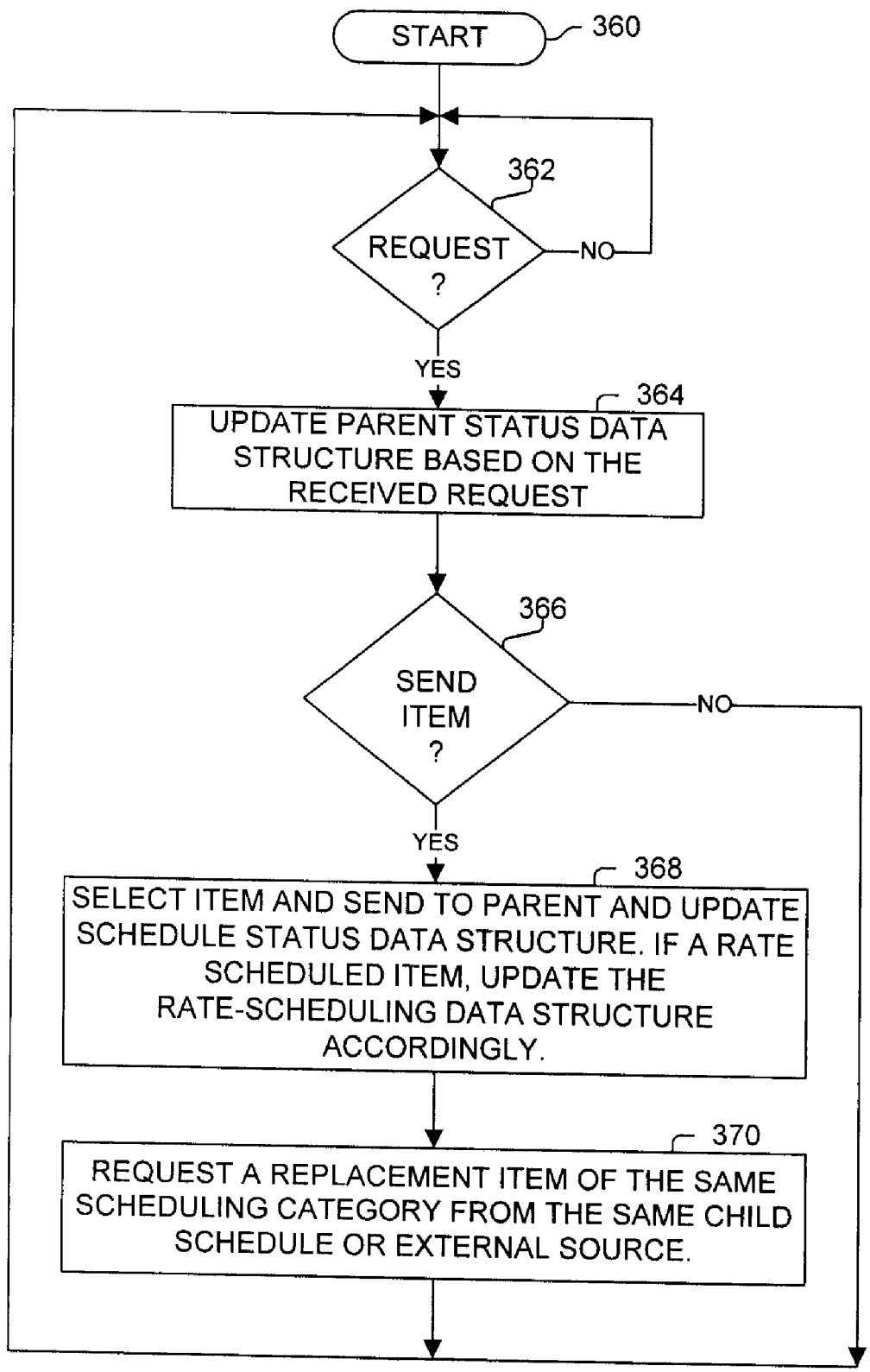

FIG. 3C illustrates a process used in one embodiment for propagating items to a parent schedule entry of a parent schedule in response to a request from the parent for an item of a particular scheduling category. Processing begins with process block 360. As determined in process block 362, if request has been received, then in process block 364, the parent data structure, which typically identifies the scheduling categories and possibly number of items for each that its parent needs, is updated based on the received request. In process block 366, a determination is made whether or not the schedule currently has an item to send to the parent schedule entry of a parent schedule or external client. In one embodiment, this determination is simply a check to see if it has an item of the scheduling category corresponding to the received request (e.g., by checking the item storage or schedule status data structure). In one embodiment, this determination will be forced to be false even if such an item is stored in the schedule if its parent schedule (or in one embodiment, more specifically its parent schedule entry of the parent schedule) is currently storing a higher priority item that it received from this schedule. In other words, until the schedule's state determines that the parent schedule (or in one embodiment, more specifically its parent schedule entry of the parent schedule) has no items of a higher priority, an item will not be forwarded to its parent schedule entry of the parent schedule. This will not delay the scheduling of the item as a parent schedule, in determining its next scheduled item, will typically only consider items of the highest priority category received from its child. Thus, this lower priority item would not have been forwarded by the parent schedule anyway, and by delaying its propagation, a better item might be received or determined by this schedule in the mean time, and this approach might remove a race condition introduced by one implementation.

As determined in process block 366, if the schedule has an item to send to the parent, then in process block 368, a best item is selected from those items received from each of its child schedules or external sources, and the selected item is sent to the parent and the schedule status and parent status data structures are updated accordingly. In one embodiment, this item is always of the same scheduling category as that indicated in the received request. In one embodiment, this item is an item of the highest priority scheduling category needed by the parent. Also, if the item was a rate-based item, then the rate scheduling data structure is updated. In process block 370, a request for a replacement item of the same scheduling category as the item forwarded to the parent is sent to the child schedule or external source from which the item sent to the parent was received. Processing returns to process block 362.

Figure 4:
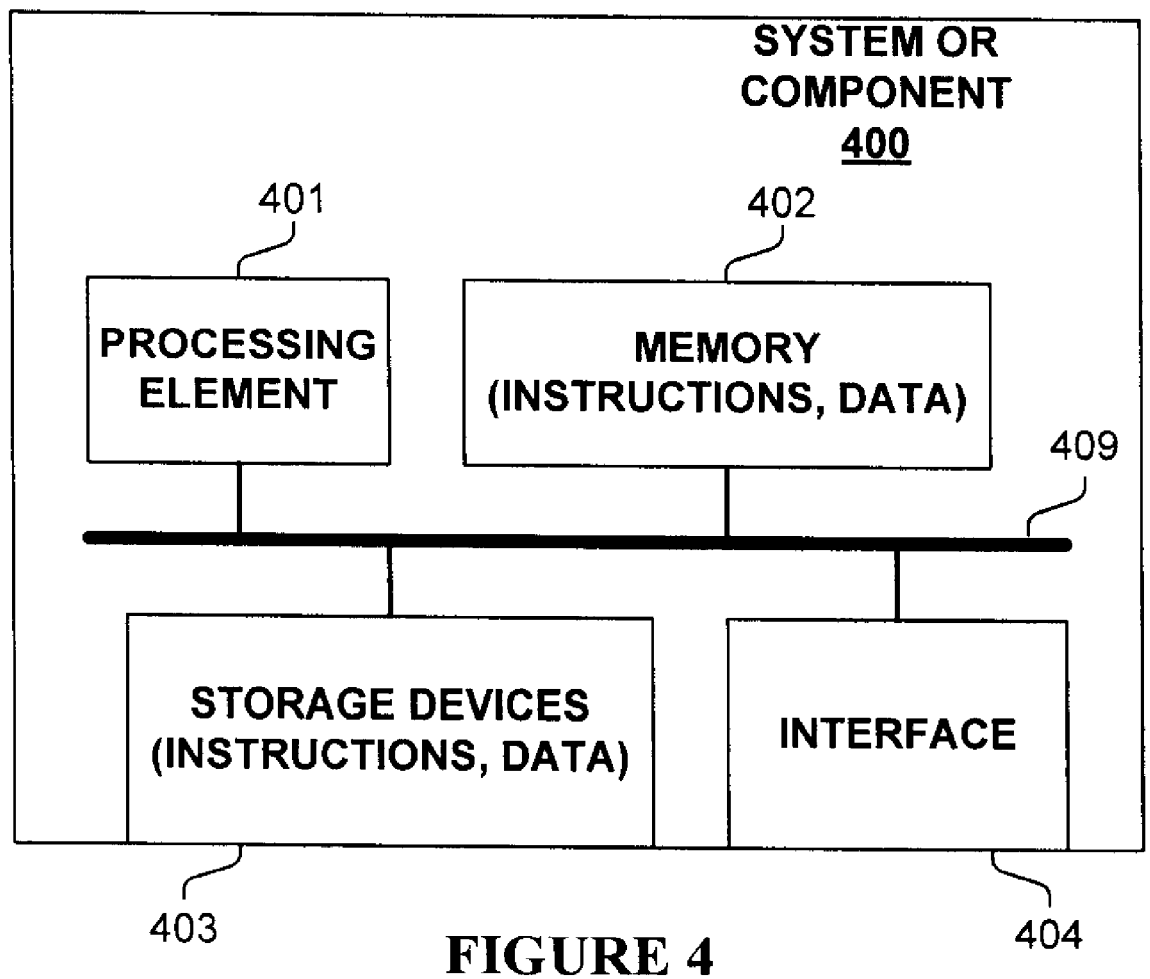
FIG. 4 is a block diagram of a schedule used in one embodiment.

FIG. 4 is a block diagram of an exemplary system or component 400 used in implementing a hierarchical schedule, whether the entire hierarchical schedule or just one or more of its schedules or schedule entries. In one embodiment, system or component 400 performs one or more processes corresponding to one of the flow diagrams illustrated or otherwise described herein.

In one embodiment, component 400 includes a processing element 401 (e.g., a processor, customized logic, etc.), memory 402, storage devices 403, and an interface 404 for receiving and sending packets, items, and/or other information, which are typically coupled via one or more communications mechanisms 409 (shown as a bus for illustrative purposes.) Various embodiments of component 400 may include more or less elements. The operation of component 400 is typically controlled by processing element 401 using memory 402 and storage devices 403 to perform one or more scheduling tasks or processes. Memory 402 is one type of computer-readable medium, and typically comprises random access memory (RAM), read only memory (ROM), flash memory, integrated circuits, and/or other memory components. Memory 402 typically stores computer-executable instructions to be executed by processing element 401 and/or data which is manipulated by processing element 401 for implementing functionality in accordance with the invention. Storage devices 403 are another type of computer-readable medium, and typically comprise solid state storage media, disk drives, diskettes, networked services, tape drives, and other storage devices. Storage devices 403 typically store computer-executable instructions to be executed by processing element 401 and/or data which is manipulated by processing element 401 for implementing functionality in accordance with the invention.

Figure 5A:
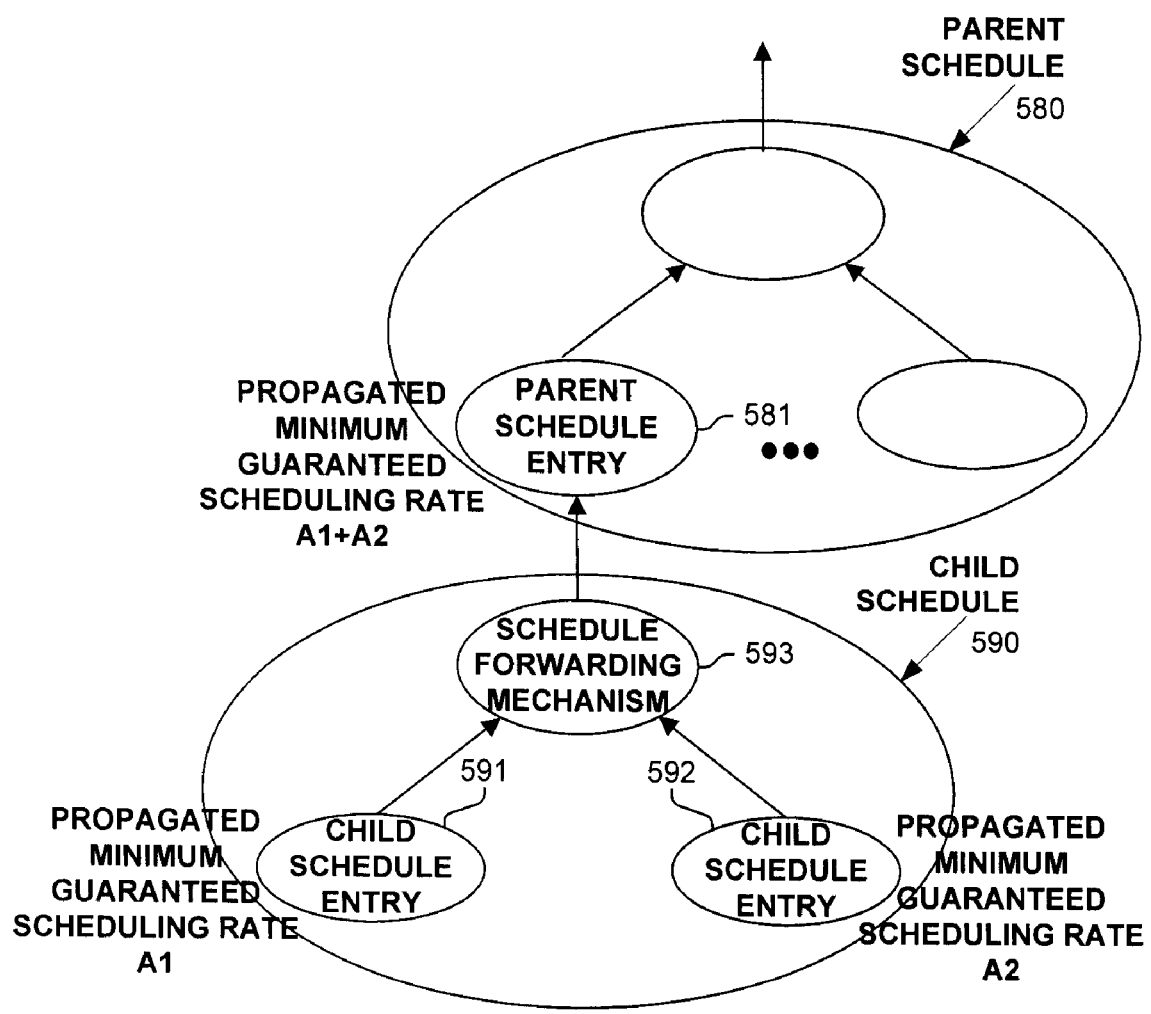
FIG. 5A illustrates the propagation of minimum guaranteed scheduling rates in one embodiment.

FIG. 5A is used to describe the propagation of minimum guaranteed scheduling rates in one embodiment. In the illustrated example, shown are schedule entries 581, 591 and 592 used to schedule traffic typically including one or more different scheduling categories (e.g., high-priority traffic, propagated minimum guaranteed scheduling rate traffic, non-propagated minimum guaranteed scheduling rate traffic, excess rate traffic, etc.). One embodiment provides multiple scheduling lanes corresponding to different categories of traffic between a parent schedule entry of a parent schedule and its child schedules (and corresponding entries thereof) such that items can propagate through the hierarchy of schedules without being blocked by or waiting behind lower priority traffic in a scheduling queue or the like.

Also, as previously discussed, one embodiment uses a recursive descent technique to identify a next items rather than actually propagating items through multiple schedules. Note, each schedule typically has as its parent a single parent schedule entry of a parent schedule or an external client, and has one or more child schedules and/or external sources for items. The number of schedules and schedule entries thereof, and their arrangement in an embodiment using a hierarchical schedule is typically determined based on the needs of the application of the embodiment. In one embodiment, a schedule has as its parent multiple schedule entries of a parent schedule, such as for, but not limited to, a schedule entry for each scheduling category—although the parent schedule entries will typically (but not in one embodiment) share one or more scheduling parameters, such as a maximum rate. Shown in FIG. 5A is a parent schedule 580 including a parent schedule entry 581, and a child schedule 590 including child schedule entries 591 and 592 and a schedule forwarding mechanism 593 for forwarding items to parent schedule entry 581 of parent schedule 580. As shown, assume schedule entry 591 has a minimum guaranteed scheduling rate of A1 and schedule entry 592 has a minimum guaranteed scheduling rate of A2. These minimum guaranteed scheduling rates are propagated such that parent schedule entry 581 acquires a propagated minimum guaranteed rate based on the minimum guaranteed scheduling rates of child schedule entries 591 and 592 of child schedule 590 (with the minimum guaranteed scheduling rates of child schedule entries 591 and 592 possibly being acquired propagated minimum guaranteed scheduling rates themselves).

In the example illustrated in FIG. 5A, parent schedule entry 581 uses as its propagated minimum guaranteed scheduling rate a rate based on the aggregation (e.g., A1+A2, or some fraction, multiple, or function thereof) of the propagated minimum guaranteed scheduling rates of child schedule entries 591 and 592. In one embodiment, the propagated minimum guaranteed scheduling rate of parent schedule entry 581 is equal to (e.g., exactly equal or effectively equal to given rounding or storage errors, etc.) the summation of the propagated minimum guaranteed scheduling rates of child schedule entries 591 and 592 of child schedule 590. In one embodiment, the propagated minimum guaranteed scheduling rate of parent schedule entry 581 is greater than the summation of the propagated minimum guaranteed scheduling rates of child schedule entries 591 and 592. In one embodiment, this aggregation only includes the propagated minimum guaranteed scheduling rates of child schedule entries 591 and 592 used in actively scheduling traffic of a propagated minimum guaranteed scheduling rate type.

Figure 5B:
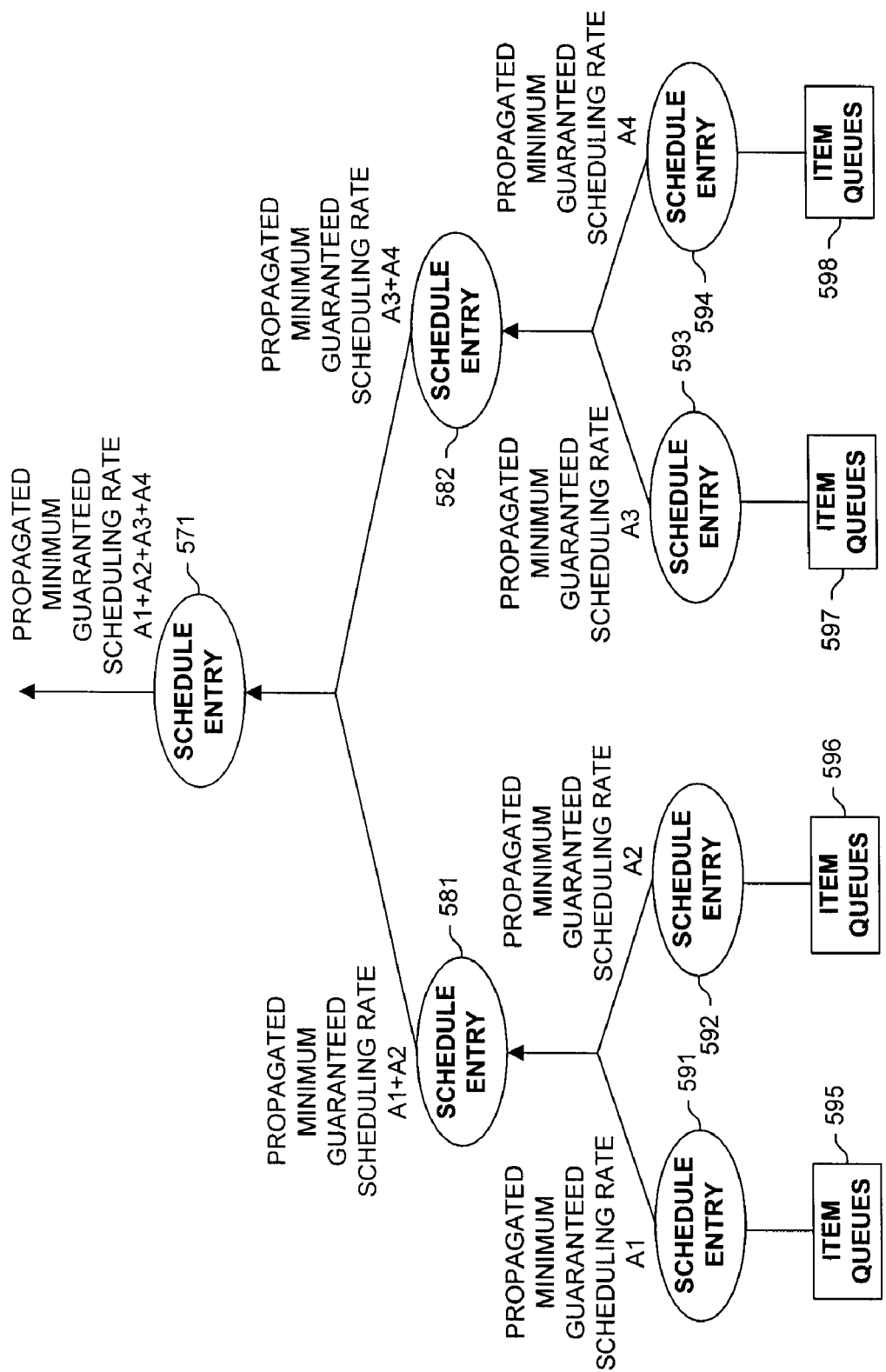
FIG. 5B illustrates the propagation of minimum guaranteed scheduling rates in one embodiment.

FIG. 5B expands this example to show that the propagated minimum guaranteed scheduling rates can propagate over several scheduling layers. Shown in FIG. 5B are schedule entry 571, schedule entries 581 and 582 typically included in a same schedule, schedule entries 591 and 592 typically included in a same schedule, and schedule entries 593 and 594 typically included in a same schedule. As this figure illustrates the propagation of propagated minimum guaranteed scheduling rates and the flow of items among schedule entries 571-594, the partitioning of schedule entries 571-594 is not shown for ease of presentation.

As shown, each schedule entry of the lowest layer of schedule entries 591-594 schedules and forwards items from queues 595-598 to its respective parent schedule entry 581 or 582, which schedules and forwards items to its parent schedule entry 571. These propagated minimum guaranteed scheduling rates are propagated from child schedule entries to their respective parent schedule entries, which use as their propagated minimum guaranteed scheduling rate a rate based on the aggregation of the propagated minimum guaranteed scheduling rates of their child schedule entries. For example and as shown, schedule entry 571 uses as its propagated minimum guaranteed scheduling rate a rate based on the aggregation of propagated minimum guaranteed scheduling rate A1, A2, A3 and A4 (i.e., the propagated minimum guaranteed scheduling rates inherited from its child schedule entries 581-582, which inherit from their child schedule entries 591-592 and 593-594). In one embodiment, this aggregation only includes the propagated minimum guaranteed scheduling rates of child schedule entries currently used in actively scheduling traffic of a propagated minimum guaranteed scheduling rate type.

Figure 6:
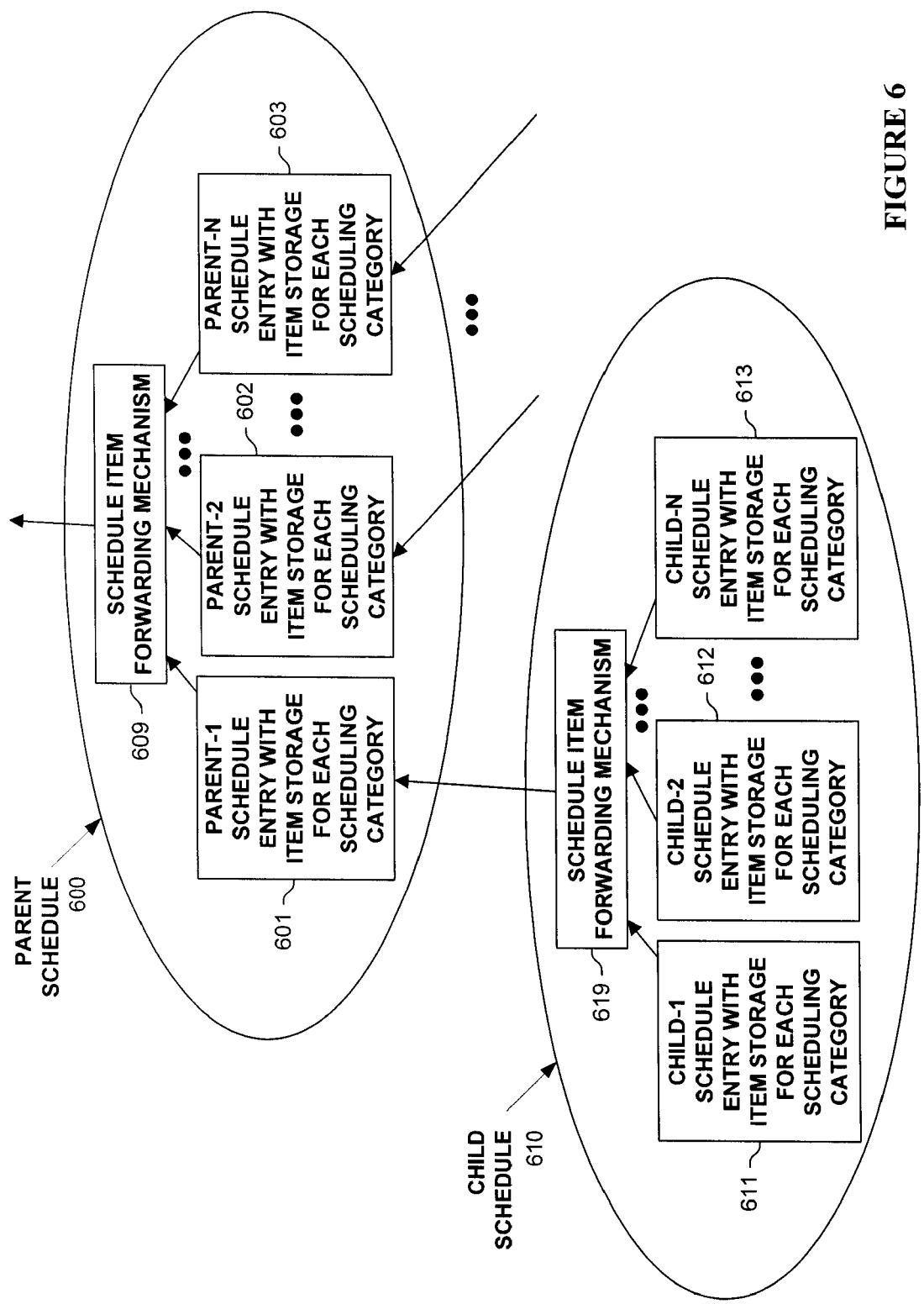
FIG. 6 illustrates the propagation of minimum guaranteed scheduling rates in one embodiment.

FIG. 6 illustrates the use of propagated minimum guaranteed scheduling rates in one embodiment. Illustrated are parent schedule 600 including schedule item forwarding mechanism 609 and schedule entries 601-603, each one typically corresponding to a child schedule (e.g., child schedule 610 and others not shown) with storage for items of each scheduling category, and child schedule 610 including schedule item forwarding mechanism 619 and schedule entries 611-613, each one typically corresponding to a child schedule (not shown) with storage for items of each scheduling category (e.g., high-priority traffic, low-priority traffic, rate-based traffic, propagated minimum guaranteed scheduling rate traffic, non-propagated minimum guaranteed scheduling rate traffic, or whatever categories match the needs of the application of the embodiment). By segregating the items by scheduling categories received from different child schedules, a schedule is able to propagate different types or priorities of traffic ahead of other traffic, even if such traffic was received earlier.

Based on the need of parent schedule 600, schedule item forwarding mechanism 619 of child schedule 610 selects and forwards a corresponding best item identified by one of its schedule entries 611-613, each of which have independently identified a next best item from all of their stored items of the various scheduling categories. Similarly, schedule item forwarding mechanism 609 of parent schedule 600 selects a corresponding best item identified by one of its schedule entries 601-603, each of which have independently identified a next best item from all of their stored items of the various scheduling categories. Any type of scheduling mechanism (e.g., using a calendar schedule, DRR, or other scheduling mechanism) can be used to identify the best item from the items received from its child schedules or external sources.

Figure 7:
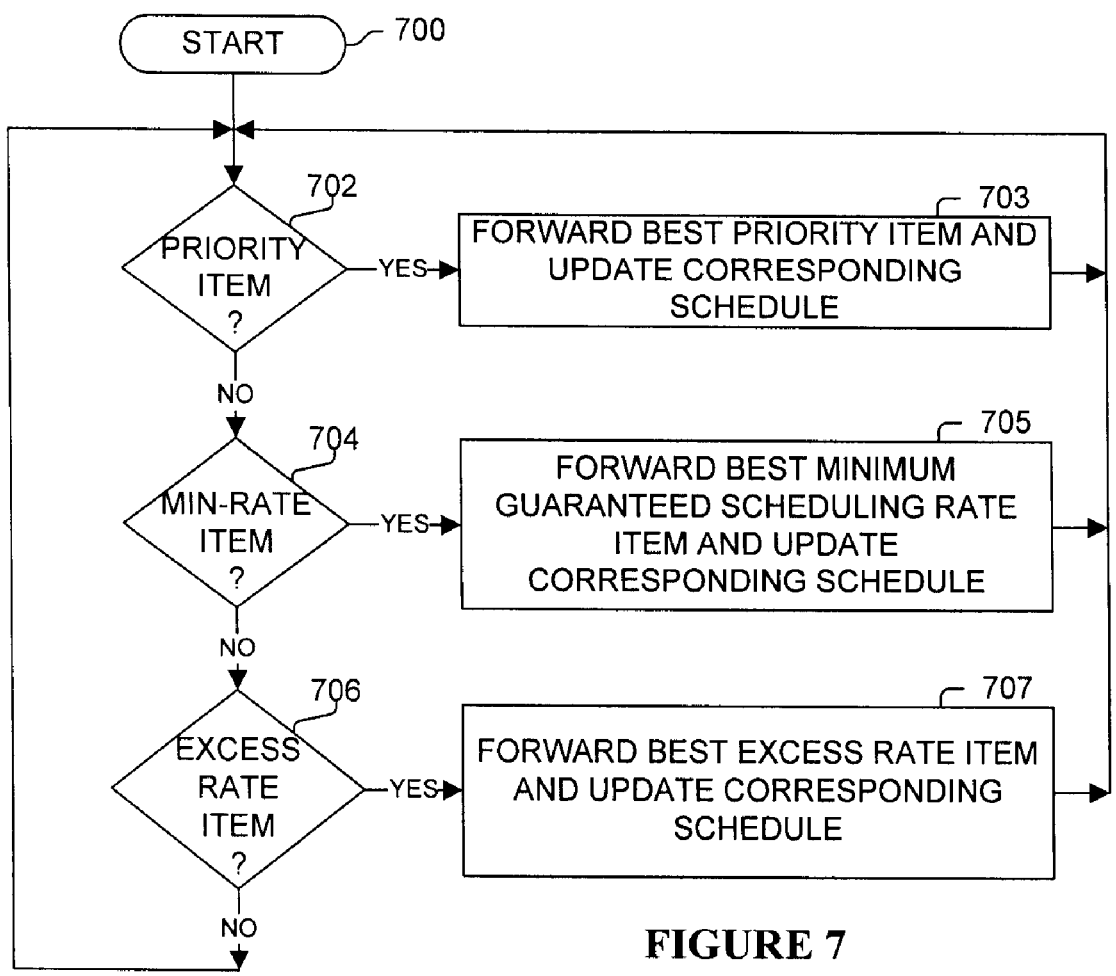
FIG. 7 is a flow diagram illustrating the selected scheduling of items from multiple scheduling classes performed in one embodiment.

FIG. 7. is a flow diagram illustrating a process used by a schedule and/or schedule in one embodiment for scheduling items from multiple scheduling classes, which include a high-priority, a propagated and/or non-propagated minimum guaranteed scheduling rate, and an excess rate scheduling categories. Processing begins with process block 700. As determined in process block 702, if at least one priority item is available for forwarding, then in process block 703, a best priority item is selected, typically based on a fair arbitration process, and forwarded to its parent and the corresponding schedule is typically updated to reflect the forwarding of the item. Many scheduling mechanisms can be used, and one such mechanism for updating a schedule is disclosed in Cohen et al., "Rate Computations of Particular Use in Scheduling Activities or Items such as the Sending of Packets," U.S. patent application Ser. No. 10/777,607, filed Feb. 11, 2004, which is hereby incorporated by reference in its entirety.

Otherwise, as determined in process block 704, if at least one minimum guaranteed scheduling rate item is available for forwarding, then in process block 705, a best guaranteed minimum rate item is selected and forwarded to its parent and the corresponding schedule is typically updated to reflect the forwarding of the item. Otherwise, as determined in process block 706, if at least one excess rate item is available to be forwarded, then in process block 707, a best excess rate item is selected and forwarded to its parent and the corresponding schedule is typically updated to reflect the forwarding of the item. Processing returns to process block 702 to continue forwarding and scheduling more items.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
employing a particular machine to perform steps for implementing a hierarchical schedule for scheduling items, the hierarchical scheduling including a parent schedule and a child schedule; the parent schedule including a parent schedule entry associated with a parent propagated minimum guaranteed scheduling rate; the child schedule including a plurality of child schedule entries, with each of the plurality of child schedule entries associated with propagated minimum guaranteed scheduling rates; wherein said steps include:
scheduling, by the parent schedule, traffic including items of a propagated minimum guaranteed scheduling rate type received from the child schedule; and
scheduling, by the child schedule, traffic including items of the propagated minimum guaranteed scheduling rate type;
wherein the parent propagated minimum guaranteed scheduling rate is determined based on an aggregation of said propagated minimum guaranteed scheduling rates associated with the plurality of child schedule entries;
wherein the parent propagated minimum guaranteed scheduling rate does not include said propagated minimum guaranteed scheduling rates associated with a particular one of the plurality of child schedule entries which is not actively scheduling traffic of the propagated minimum guaranteed scheduling rate type.

2. The method of claim 1, wherein said items includes packets or indications corresponding to said packets.

3. The method of claim 2, wherein said step of scheduling of traffic by the child schedule includes updating a particular schedule entry of the plurality of child schedule entries for each said packet to be forwarded corresponding to the particular schedule entry based on the size of a corresponding packet of said packets.

4. The method of claim 2, wherein said scheduling of traffic by the parent schedule includes updating the parent schedule entry for each said packet to be forwarded corresponding to the parent schedule entry based on the size of a corresponding packet of said packets.

5. The method of claim 1, wherein each of the plurality of child schedule entries is scheduled with a maximum traffic rate equal to its corresponding said propagated minimum guaranteed scheduling rate.

6. The method of claim 5, wherein traffic of the propagated minimum guaranteed scheduling rate type in each of the plurality of child schedule entries is scheduled with a maximum traffic rate equal to its said corresponding propagated minimum guaranteed scheduling rate.

7. The method of claim 1, wherein the parent schedule includes storage for each of a plurality of scheduling categories, the plurality of scheduling categories including the propagated minimum guaranteed scheduling rate type.

8. The method of claim 7, wherein items corresponding to the propagated minimum guaranteed scheduling rate type are scheduled at the parent propagated minimum guaranteed scheduling rate.

9. The method of claim 7, wherein the plurality of scheduling categories includes a non-propagated minimum guaranteed scheduling rate type.

10. The method of claim 7, wherein the plurality of scheduling categories includes a high priority traffic category to be scheduled by the parent schedule and the child schedule with a higher scheduling priority than said propagated minimum guaranteed scheduling rate traffic.

11. The method of claim 1, wherein the parent propagated minimum guaranteed scheduling rate is equal to the sum of said propagated minimum guaranteed scheduling rates associated with the plurality of child schedule entries.

12. The method of claim 1, wherein the parent propagated minimum guaranteed scheduling rate is equal to the sum of said propagated minimum guaranteed scheduling rates associated with the plurality of child schedule entries which are actively scheduling traffic of the propagated minimum guaranteed scheduling rate type.

13. A method, comprising:
employing a particular machine to perform steps for implementing a hierarchical schedule for scheduling items, the hierarchical scheduler including a root schedule and one or more layers of schedules, with each of said one or more layers including at least one schedule, each schedule of the hierarchical schedule including one or more schedule entries, wherein said steps comprise:
communicating, by each schedule of said one or more layers of schedules, selected scheduled items to its parent schedule in the hierarchical schedule; wherein said each particular schedule entry of the hierarchical schedule having one or more child schedules is configured to maintain items of a plurality of different scheduling categories received from said child schedules; and
scheduling, by each particular schedule of the hierarchical schedule having one or more child schedules, the sending of said items to its parent schedule or to a schedule client based on said different scheduling categories of said items;
wherein said different scheduling categories include a propagated minimum guaranteed scheduling rate type and each of a plurality of said schedule entries is associated with a propagated minimum guaranteed scheduling rate; and wherein said propagated minimum guaranteed scheduling rate of a parent schedule entry of said schedule entries is determined based on an aggregation of said propagated minimum guaranteed scheduling rates of each of said schedule entries of its immediate one or more child schedules;
wherein said propagated minimum guaranteed scheduling rate of the parent schedule entry does not include said propagated minimum guaranteed scheduling rates associated with a particular one of its immediate child schedules which is not actively scheduling traffic of the propagated minimum guaranteed scheduling rate type.

14. The method of claim 13, wherein a maximum traffic rate of each of said immediate child schedules is equal to its corresponding said propagated minimum guaranteed scheduling rate.

15. The method of claim 13, wherein said propagated minimum guaranteed scheduling rate of a parent schedule entry is equal to the sum of said propagated minimum guaranteed scheduling rate of each of its immediate child schedules.

16. The method of claim 13, wherein said different scheduling categories also include a high-priority traffic type; wherein items corresponding to the high-priority traffic type are forwarded prior to items corresponding to the propagated minimum rate guarantee traffic type.

17. The method of claim 13, wherein said items include packets or indications corresponding to said packets.

18. The method of claim 13, wherein said propagated minimum guaranteed scheduling rate of the parent schedule entry is equal to the sum of said propagated minimum guaranteed scheduling rate of each of its immediate child schedules which are actively scheduling traffic of the propagated minimum guaranteed scheduling rate type.

19. The method of claim 13, wherein the aggregation of said propagated minimum guaranteed scheduling rate of each of its immediate child schedules excludes said propagated minimum guaranteed scheduling rate of each of its immediate child schedules that are not actively scheduling traffic of the propagated minimum guaranteed scheduling rate type.

20. A method, comprising:
employing a particular machine to perform steps for implementing a hierarchical schedule for scheduling items of a plurality of different scheduling categories, the plurality of different scheduling categories including a propagated minimum guaranteed scheduling rate category and an excess rate based category; wherein the hierarchical schedule comprises: a plurality of child schedules; and a parent schedule including a plurality of schedule entries; wherein said steps include:
receiving and storing, by the parent schedule, items scheduled by each of the plurality of child schedules into the plurality of schedule entries; and
identifying, by the parent schedule, a best scheduled item from said items currently stored in the plurality of schedule entries from each of the plurality of child schedules;
wherein items of the propagated minimum guaranteed scheduling rate category and items of the excess rate based category share a common minimum guaranteed rate in each of the plurality of schedule entries; and wherein items corresponding to the propagated minimum guaranteed scheduling rate category associated with a particular schedule entry of the plurality of schedule entries are scheduled before items corresponding to the excess rate based category associated with the particular schedule entry.

21. The method of claim 20, wherein items of the propagated minimum guaranteed scheduling rate category and items of the excess rate based category share a common maximum rate in each of the plurality of schedule entries.

22. The method of claim 20, wherein the plurality of different scheduling categories include a priority scheduling category; and wherein items corresponding to the priority scheduling category associated with the particular schedule entry are scheduled before items corresponding to the propagated minimum guaranteed scheduling rate and excess rate based scheduling categories.

23. The method of claim 20, wherein the plurality of different scheduling categories include a priority scheduling category; and wherein items corresponding to the priority scheduling category are scheduled before items corresponding to the propagated minimum guaranteed scheduling rate and excess rate based scheduling categories.

* * * * *